(12) United States Patent
Huang et al.

(10) Patent No.: US 11,271,745 B2
(45) Date of Patent: Mar. 8, 2022

(54) METHOD AND SYSTEM FOR OPERATING INTERNET OF THINGS DEVICE

(71) Applicant: ADVANCED NEW TECHNOLOGIES CO., LTD., Grand Cayman (KY)

(72) Inventors: Qi Huang, Hangzhou (CN); Hui Liao, Hangzhou (CN)

(73) Assignee: ADVANCED NEW TECHNOLOGIES CO., LTD., George Town (KY)

( * ) Notice: Subject to any disclaimer, the term of this patent is extended or adjusted under 35 U.S.C. 154(b) by 0 days.

(21) Appl. No.: 17/313,934

(22) Filed: May 6, 2021

(65) Prior Publication Data
US 2021/0266171 A1 Aug. 26, 2021

Related U.S. Application Data

(63) Continuation of application No. PCT/CN2020/070659, filed on Jan. 7, 2020.

(30) Foreign Application Priority Data

Mar. 19, 2019 (CN) .......................... 201910210669.6

(51) Int. Cl.
*H04L 9/32* (2006.01)
*H04L 9/08* (2006.01)
*H04L 9/14* (2006.01)

(52) U.S. Cl.
CPC .......... *H04L 9/3231* (2013.01); *H04L 9/0825* (2013.01); *H04L 9/0869* (2013.01); *H04L 9/0897* (2013.01); *H04L 9/14* (2013.01)

(58) Field of Classification Search
CPC ... H04L 9/3231; H04L 9/0869; H04L 9/0825; H04L 9/14; H04L 9/0897
See application file for complete search history.

(56) References Cited

U.S. PATENT DOCUMENTS 9,319,404 B2 4/2016 Svigals
9,832,019 B2 11/2017 Choi
(Continued)

FOREIGN PATENT DOCUMENTS

CN 105959287 A 9/2016
CN 106325078 A 1/2017
(Continued)

OTHER PUBLICATIONS

Search Report for Taiwanese Application No. 108134196 dated Sep. 9, 2020.
(Continued)

*Primary Examiner* — Abiy Getachew

(57) ABSTRACT

Embodiments of this specification provide methods and systems for operating an IoT device An exemplary method comprises: receiving, by a user equipment, an operation instruction for the IoT device from a user, wherein the user equipment is communicatively coupled with the IoT device; identifying, by the user equipment, a biometric feature of the user; verifying, by the user equipment, an identity of the user based on the biometric feature; signing, by the user equipment, the operation instruction using a first user key of the user in response to the identity of the user being verified; transmitting, by the user equipment, the signed operation instruction to the IoT device; verifying, by the IoT device, the signed operation instruction using a second user key of the user; and executing, by the IoT device, the operation instruction in response to the signed operation instruction being verified.

18 Claims, 7 Drawing Sheets

(56) References Cited

U.S. PATENT DOCUMENTS

| | | |
|---|---|---|
| 9,913,135 B2 | 3/2018 | Perold et al. |
| 10,164,966 B2 | 12/2018 | Wilson |
| 10,178,530 B2 * | 1/2019 | Forood ............... G08B 13/1436 |
| 10,552,645 B2 | 2/2020 | Krawczewicz et al. |
| 10,572,640 B2 | 2/2020 | Yan et al. |
| 10,749,865 B2 | 8/2020 | Andrade |
| 10,921,787 B1 * | 2/2021 | Kursun ................. H04L 63/102 |
| 10,924,475 B2 | 2/2021 | Tschofenig et al. |
| 2015/0312041 A1 * | 10/2015 | Choi ....................... G06F 21/33 |
| | | 713/175 |
| 2015/0324568 A1 | 11/2015 | Publicover et al. |
| 2016/0364553 A1 | 12/2016 | Smith et al. |
| 2017/0118181 A1 | 4/2017 | Reese et al. |
| 2017/0171204 A1 | 6/2017 | Forood et al. |
| 2017/0206532 A1 | 7/2017 | Choi |
| 2017/0244703 A1 * | 8/2017 | Lee ..................... H04W 12/065 |
| 2017/0359338 A1 | 12/2017 | Tschofenig et al. |
| 2018/0078843 A1 | 3/2018 | Tran et al. |
| 2019/0034919 A1 | 1/2019 | Nolan et al. |
| 2019/0035018 A1 | 1/2019 | Nolan et al. |
| 2019/0058586 A1 | 2/2019 | Kumar et al. |
| 2019/0268332 A1 | 8/2019 | Wang |
| 2019/0286807 A1 | 9/2019 | Sugaya et al. |

FOREIGN PATENT DOCUMENTS

| | | |
|---|---|---|
| CN | 106850209 A | 6/2017 |
| CN | 106850664 A | 6/2017 |
| CN | 107026874 A | 8/2017 |
| CN | 107370597 A | 11/2017 |
| CN | 107919962 A | 4/2018 |
| CN | 108600183 A | 9/2018 |
| CN | 109150508 A | 1/2019 |
| CN | 110011985 A | 7/2019 |
| EP | 3288214 A1 | 2/2018 |
| GB | 2533348 B | 7/2021 |
| WO | 2017199353 A1 | 11/2017 |

OTHER PUBLICATIONS

Written Opinion and International Search Report for PCT Application No. PCT/CN2020/070659 dated Mar. 26, 2020.

First Search for Chinese Application No. 201910210669.6 dated Apr. 1, 2021.

Extended Search Report for European Application No. 20 772 610.0 dated Dec. 16, 2021.

* cited by examiner

METHOD AND SYSTEM FOR OPERATING INTERNET OF THINGS DEVICE

CROSS REFERENCE TO RELATED APPLICATIONS

The present application is a continuation application of the International Patent Application No. PCT/CN2020/070659, filed on Jan. 7, 2020, and titled "METHOD AND SYSTEM FOR OPERATING INTERNET OF THINGS DEVICE," which claims priority to Chinese Patent Application No. 201910210669.6 filed on Mar. 19, 2019. The entire contents of all of the above applications are incorporated herein by reference in their entirety.

TECHNICAL FIELD

Embodiments of this specification relate to an Internet of Things device, and in particular, to a method and system for operating an Internet of Things device.

BACKGROUND

Internet of Things (IoT) devices are widely used. A user may directly operate an IoT device or may indirectly operate the IoT device using another device (such as a smart phone and other user equipment). When operating the IoT device remotely, the user usually first binds another device to the IoT device, and then transmit an instruction to the IoT device using the other device. However, there may be a security risk in using another device to operate the IoT device. Therefore, there is a need for methods and systems that can enhance the security during the operation of the IoT device through another device.

SUMMARY

To overcome issues in existing technologies, embodiments of this specification provide technical solutions that can enhance the security during operation of an IoT device.

Embodiments of this specification provide methods for operating an IoT device. An exemplary method includes: receiving, by a user equipment, an operation instruction for the IoT device from a user, wherein the user equipment is communicatively coupled with the IoT device; identifying, by the user equipment, a biometric feature of the user; verifying, by the user equipment, an identity of the user based on the biometric feature; signing, by the user equipment, the operation instruction using a first user key of the user in response to the identity of the user being verified; transmitting, by the user equipment, the signed operation instruction to the IoT device; verifying, by the IoT device, the signed operation instruction using a second user key of the user; and executing, by the IoT device, the operation instruction in response to the signed operation instruction being verified.

In some embodiments, the method further includes: receiving, by the user equipment, a random number from the IoT device, wherein the random number is generated by and stored in the IoT device; transmitting, by the user equipment, the random number with the signed operation instruction to the IoT device; comparing, by the IoT device in response to the signed operation instruction being verified, the random number received from the user equipment with the random number generated by the IoT device; and executing, by the IoT device, the operation instruction in response to the random number received by the IoT device from the user equipment being consistent with the random number generated by the IoT device.

In some embodiments, the method further includes: invalidating, by the IoT device, the random number after the operation instruction is executed.

In some embodiments, the first user key is a user private key of the user, and the second user key is a user public key of the user.

In some embodiments, the first user key and the second user key are the same user key of the user.

In some embodiments, the method further includes: binding, by the user equipment and prior to receiving the operation instruction for the IoT device from the user, the IoT device to the user equipment.

In some embodiments, the method further includes: identifying, by the user equipment, the biometric feature of the user; verifying, by the user equipment, the identity of the user based on the biometric feature; and transmitting, by the user equipment, the second user key to the IoT device in response to the identity of the user being verified.

In some embodiments, the method further includes: generating, by the user equipment, the first user key and the second user key.

In some embodiments, the method further includes: receiving, by the user equipment, the biometric feature of the user entered by the user, and generating, by the user equipment, the first user key and the second user key for the user.

In some embodiments, the first user key and the second user key are stored in a secure environment of the user equipment, and the secure environment is a trusted execution environment or a hardware secure element.

Embodiments of the present disclosure further provide a system, including: a user equipment configured to: receive an operation instruction for an IoT device from a user, identify a biometric feature of the user, verify an identity of the user based on the biometric feature, and sign the operation instruction using a first user key of the user if the identity of the user is verified; and the IoT device, configured to: receive the signed operation instruction from the user equipment, verify the signed operation instruction using a second user key of the user, and execute the operation instruction if the signed operation instruction is verified.

Embodiments of the present disclosure further provide one or more non-transitory computer-readable storage media storing instructions executable by one or more processors, wherein execution of the instructions causes the one or more processors to perform operations comprising: receiving, by a user equipment, an operation instruction for the IoT device from a user, wherein the user equipment is communicatively coupled with the IoT device; identifying, by the user equipment, a biometric feature of the user; verifying, by the user equipment, an identity of the user based on the biometric feature; signing, by the user equipment, the operation instruction using a first user key of the user in response to the identity of the user being verified; transmitting, by the user equipment, the signed operation instruction to the IoT device; verifying, by the IoT device, the signed operation instruction using a second user key of the user; and executing, by the IoT device, the operation instruction in response to the signed operation instruction being verified.

BRIEF DESCRIPTION OF THE DRAWINGS

To describe the technical solutions in the embodiments of this specification or in the existing technologies more clearly, the following briefly describes the accompanying drawings required for describing the embodiments or the existing technologies. Apparently, the accompanying drawings in the following description show merely some of the embodiments of this specification, and a person of ordinary skill in the art may still derive other drawings from the accompanying drawings.

DETAILED DESCRIPTION

To enable a person skilled in the art to better understand technical solutions in the embodiments of this specification, the technical solutions in the embodiments of this specification are described in detail below with reference to the accompanying drawings in the embodiments of this specification. Obviously, the described embodiments are only a part of the embodiments of this specification, other than all of the embodiments. Based on the embodiments in this specification, all other embodiments obtained by a person of ordinary skill in the art should fall within the protection scope.

Biometric feature identification technology is a technology that can perform identity authentications using human biometric features. Conventional identity authentication methods may involve identity identification items (e.g., a key, a certificate, and an ATM card, etc.) and identity identification information (e.g., a user name and a password). Compared with conventional identity authentication methods, the biometric feature identification technology can be more secure, more confidential, and more convenient. The biometric feature identification technology has a number of advantages. For example, biometric features are not easy to forget (e.g., unlike a user name and a password). Also, the biometric features are harder to duplicate or hack. As a result, they are good anti-counterfeit and anti-theft performance. Moreover, using biometric features in identity authentication can be more convenient, since they can be available anytime and anywhere.

There are a number of different types of biometric feature identification technologies, such as fingerprint identification, palm print (hand geometry) identification, iris identification, face identification, voice identification, signature identification, and gene identification. In the following, fingerprints are usually used as an example, but it is appreciated that other biometric features besides fingerprints may be used.

Figure 1:
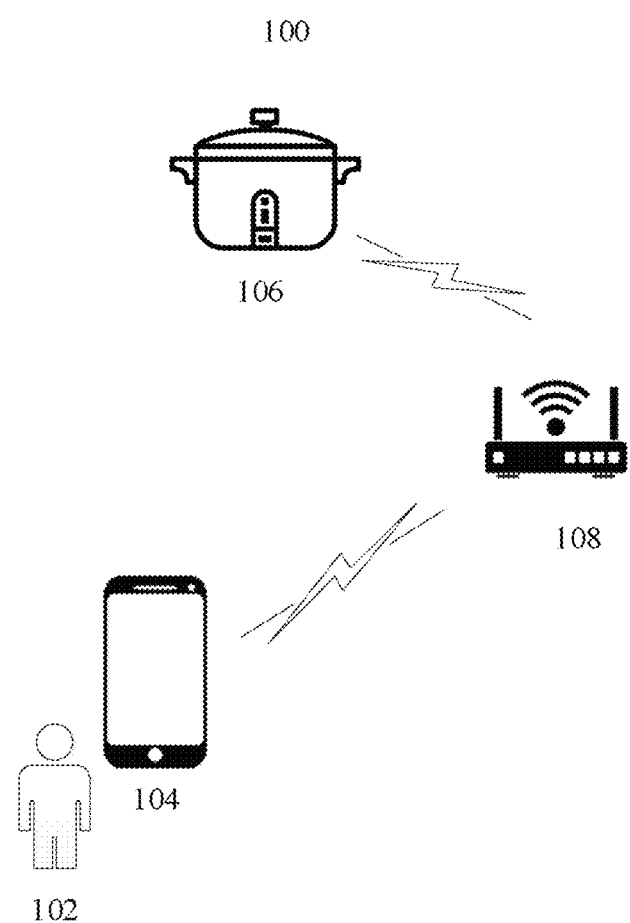
FIG. 1 is a schematic of an example system, according to some embodiments of this specification.

FIG. 1 shows a schematic of an example system, according to some embodiments of this specification. As shown in FIG. 1, a system 100 may include a user equipment 104 and an IoT device 106. The user equipment 104 can be used by a user 102. In some embodiments, the user equipment 104 or the IoT device 106 includes electrical circuitry.

In some embodiments, the user equipment 104 can be a mobile device such as a mobile communication device (e.g., a smart phone), a tablet computer, a notebook computer, or a personal digital assistant (PDA). It is appreciated that the user equipment 104 may be other devices such as a desktop computer or a set-top box.

In some embodiments, the user equipment 104 may be capable of performing biometric feature identifications. For example, the user equipment 104 may include a fingerprint scanner configured to scan a fingerprint of the user 102 and process scanned data to identify the fingerprint of the user 102 and thus authenticate the user.

The IoT device 106 may be communicatively coupled to the IoT network. In some embodiments, the IoT device 106 has a network connection capability to interact with another device using an IoT network. In some embodiments, the IoT device 106 may be bound to the user equipment 104, so that the user equipment 104 may control the IoT device 106 or may perform other interactions with the IoT device 106 (e.g., through the network connection or the IoT network).

Examples of the IoT device 106 can include an industrial device and a household device. For example, the IoT device 106 can be an industrial robot, a smart medical device, an automobile, a door lock, a rice cooker, and a refrigerator. In the following examples, a smart rice cooker is used as an example for description, but it is appreciated that embodiments of this specification are not limited to a specific IoT device.

In some embodiments, an application that interacts with the IoT device 106 may be installed on the user equipment 104. In some embodiments, the application may be an application for one or more IoT devices. For example, the application may be a smart rice cooker application dedicated to a smart rice cooker. Alternatively, the application may be a general application for an IoT device of a certain brand. Alternatively, the application may be a system-level IoT device application. In the following examples, a smart rice cooker application is used as an example for description, but it is appreciated that the embodiments of this specification are not limited to a smart rice cooker application.

Referring back to FIG. 1, in some embodiments, the system 100 may further include a router 108. A network connection may be established between the user equipment 104 and the IoT device 106 using the router 108, so that the user equipment 104 can communicate with the IoT device 106 using a network. In some embodiments, the network is a wireless network.

In some embodiments, the system 100 may not include the router 108, and the user equipment 104 and the IoT device 106 may be connected in other ways (e.g., connected through infrared, Bluetooth, Zigbee, etc.).

Figure 2:
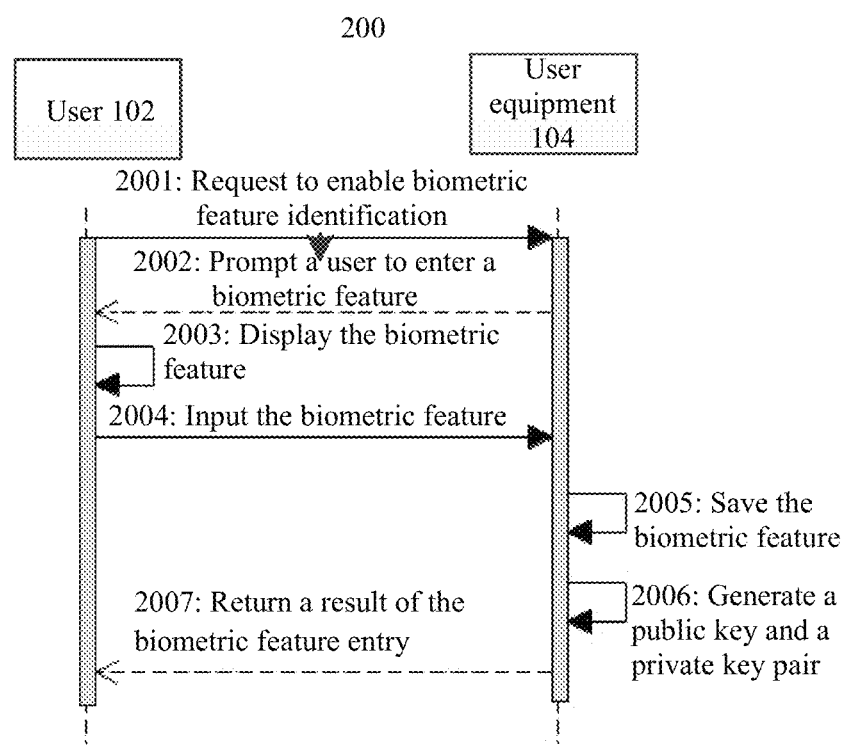
FIG. 2 is a diagram of an example process for entering a biometric feature, according to some embodiments of this specification.

FIG. 2 is a diagram of an example process for entering a biometric feature, according to some embodiments of this specification. As shown in FIG. 2, an operation 200 can involve a user 102 and a user equipment 104 (e.g., the user 102 and the user equipment 104 shown in FIG. 1).

In some embodiments, to perform identity authentication using a biometric feature, a biometric feature of the user 102 may need to be entered first, so as to associate the biometric feature with the user 102.

In operation 2001 of FIG. 2, the user 102 may request the user equipment 104 to enable biometric feature identification. In some embodiments, the user 102 may click or tap a control on the smart rice cooker application in the user equipment 104 to request to enable the biometric feature identification. For example, the user 102 may click or tap a button "use fingerprint identification" on the user equipment 104 to transmit a request for enabling the biometric feature identification to the user equipment 104. In some embodiments, the user equipment 104 may prompt the user 102 to enable the biometric feature identification when the user 102 opens or uses the smart rice cooker application.

In some embodiments, it is possible that the user 102 has not entered the biometric feature on the user equipment 104. In this case, the following process of entering a biometric feature may be performed.

In operation 2002 of FIG. 2, the user equipment 104 may prompt the user to enter the biometric feature. For example, the user equipment may prompt the user 102 to put a finger on a fingerprint scanner. In some embodiments, this operation may be skipped. For example, when a user feature is an iris or a pupil of the user 102, the iris or the pupil of the user 102 may be directly scanned without prompting the user.

In operation 2003 of FIG. 2, the user 102 may enter the biometric feature according to the prompt shown in operation 2002. For example, the user 102 may put the finger on the fingerprint scanner of the user equipment 104, and the biometric feature in the fingerprint can be entered to the user equipment 104.

In operation 2004 of FIG. 2, the biometric feature of the user 102 may be transmitted to the user equipment 104. For example, the fingerprint scanner of the user equipment 104 may read the biometric feature (e.g., fingerprint feature) of the user 102, where the biometric feature is in the user 102's fingerprint.

In operation 2005, the user equipment 104 may store the biometric feature of the user 102. In some embodiments, the biometric feature of the user 102 may be stored in the user equipment 104 and associated with the user 102.

In some embodiments, additional prompt can be presented to the user 102 during the operation of entering the biometric feature to obtain more complete biometric data. For example, during the fingerprint scanning process, the user 102 may be prompted to move the finger, so that complete more complete fingerprint data can be obtained.

In some embodiments, an identity authentication process can be performed later by the user equipment 104, and a fingerprint of a to-be-authenticated user may be scanned to extract a fingerprint feature and compare the extracted fingerprint feature with a stored fingerprint feature, so as to determine whether the two fingerprint features match and further authenticate an identity of the user.

In some embodiments, the user 102 may have entered the biometric feature on the user equipment 104. For example, the user 102 may have previously entered the fingerprint on the user equipment 104. In this case, there is no need to enter the biometric feature again, and the entered biometric feature can be used.

In some embodiments, regardless of whether there is an entered biometric feature stored on the user equipment 104, a dedicated biometric feature may be entered for a specific IoT device. For example, a biometric feature dedicated to the smart rice cooker may be entered using the smart rice cooker application. Security may be further enhanced by using the biometric feature dedicated to the specific IoT device.

In operation 2006 of FIG. 2, the user equipment 104 may further generate a public key and a private key pair for the user 102. In some embodiments, a user public key of the key pair may be stored in the IoT device 106, and a user private key of the key pair may be stored in the user equipment 104.

In some embodiments, the user public key in the IoT device 106 may be used for verifying the private key on the user equipment 104.

In some embodiments, a symmetric encryption solution may be adopted. For example, the user equipment 104 may generate a single user key, and the single user key may be stored on the user equipment 104 and stored on the IoT device 106 later, so that the user key on the IoT device 106 may be used for verifying the user key on the user equipment 104.

In some embodiments, the user equipment 104 may include a secure environment. A user private key or a biometric feature of the user 102 may be stored in the secure environment. In some embodiments, the secure environment may be a software-level secure environment or a hardware-level secure environment, or a combination thereof.

In some embodiments, the user equipment 104 may include a Trusted Execution Environment (TEE). In some embodiments, the TEE is a secure environment implemented by an independent operating system in the user equipment 104 and isolated from a main operating system of the user equipment 104. The TEE may be used for ensuring the secure operations such as key storage, calculation, and biometric feature identification. In this case, the private key of the user 102 may be stored in the TEE.

In some embodiments, the user equipment 104 may include a Secure Element (SE). In some embodiments, the SE can be provided in hardware (e.g., a chip, an ASIC, an FPGA, etc.). To prevent external malicious parser attacks and protect data security, the SE can have an encryption/decryption logic circuit. In this case, the private key of the user 102 may be stored in the SE. By using the secure environment, the protection for the public key/private key pair can be further enhanced.

In operation 2007 of FIG. 2, a result of the biometric feature entry may be returned to the user 102. For example, the user 102 may be notified that the entry of the user biometric feature is completed. In some embodiments, the user 102 may also be notified that the generation of the public key and private key pair is completed.

Figure 3:
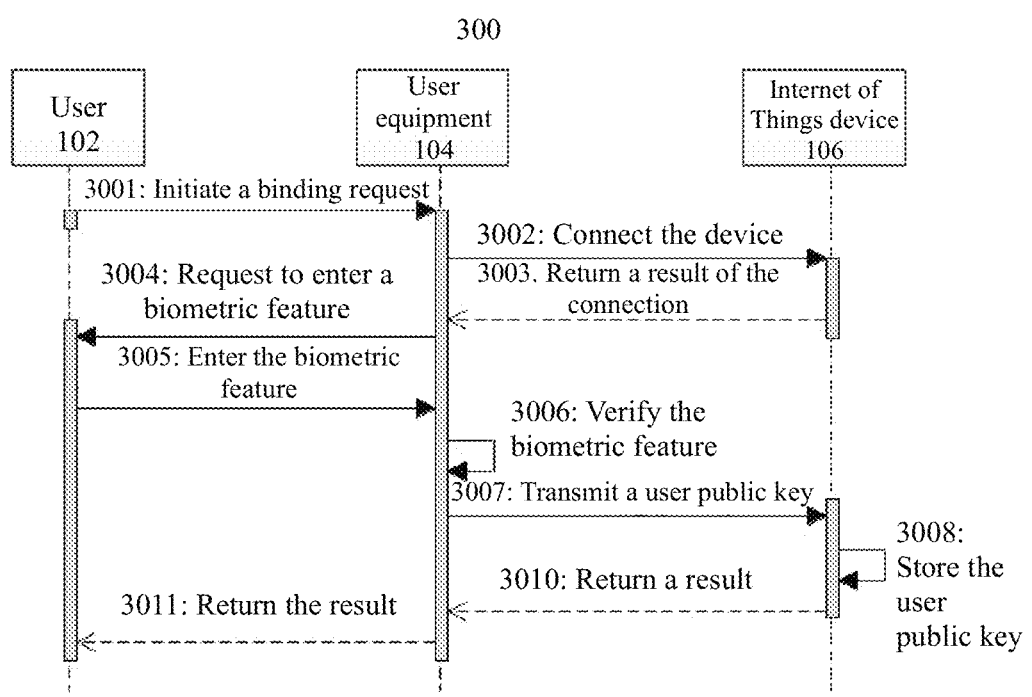
FIG. 3 is a diagram of an example process for binding an IoT device, according to some embodiments of this specification.

In some embodiments, before the user 102 is allowed to operate the IoT device 106, the IoT device 106 may be bound to the user 102 first. FIG. 3 is a schematic of an example process for binding an IoT device, according to some embodiments of this specification. As shown in FIG. 3, the operation can involve a user 102, a user equipment 104, and an IoT device 106 (e.g., the user 102, the user equipment 104, and the IoT device 106 shown in FIG. 1).

In operation 3001 of FIG. 3, the user 102 may initiate a binding request to the user equipment 104. For example, the user 102 may click or tap a control in a smart rice cooker application on the user equipment 104 to select a to-be-bound smart rice cooker. For example, the smart rice cooker may be found by searching for devices in a local area network using the user equipment 104.

In some embodiments, the user equipment 104 receives the binding request from the user 102. As shown in operation 3002 of FIG. 3, the user equipment 104 may attempt to connect to an IoT device 106 based on the binding request. In some embodiments, the connection may be implemented using the router 108 shown in FIG. 1 or implemented in another manner.

In some embodiments, as shown in operation 3003 of FIG. 3, after the connection is established successfully, the IoT device 106 may return a connection result to the user equipment 104. In addition, the user equipment 104 may also notify the user that the connection is successful.

In some embodiments, a biometric feature authentication process may be performed on the user equipment 104. For example, in operation 3004 of FIG. 3, the user equipment 104 may request the user 102 to enter a biometric feature. For example, it may be displayed in the smart rice cooker application in the user equipment 104: "Please scan a fingerprint."

In operation 3005 of FIG. 3, the user 102 may enter the biometric feature to the user equipment 104 in response to the request. For example, the user 102 may put a finger on a fingerprint scanner of the user equipment 104.

In operation 3006 of FIG. 3, the user equipment 104 may receive and verify the biometric feature entered or provided by the user 102. For example, the user equipment 104 may scan the fingerprint of the user using the fingerprint scanner. In some embodiments, the user equipment 104 may extract a scanned fingerprint feature of the user fingerprint and compare the extracted fingerprint feature with a stored user fingerprint feature, so as to determine whether the two fingerprint features match and further authenticate the user's identity.

In some embodiments, if the fingerprint feature entered by the user matches the stored user fingerprint feature, the identity of the user can be successfully authenticated. In some embodiments, if the fingerprint feature provided by the user does not match the stored user fingerprint feature, the user may be prompted that the fingerprints do not match, and the biometric feature may be re-verified or the binding process may end (e.g., the user may be prompted that the binding is unsuccessful).

In operation 3007 of FIG. 3, after the user fingerprint is verified successfully, the user equipment 104 may transmit by using, for example, the connection established in operation 3002, the user public key associated with the authenticated user 102 to the IoT device 106.

In operation 3008 of FIG. 3, after receiving the user public key associated with the user 102, the IoT device 106 may store the user public key. For example, the IoT device 106 may store the user public key in a memory of the IoT device 106. In some embodiments, the IoT device may store the user public key in a secure environment (e.g., a TEE or an SE).

In operation 3010 of FIG. 3, the IoT device 106 may return a result of storing the user public key to the user equipment 104. For example, it is acknowledged that the user public key is stored successfully.

In operation 3011 in FIG. 3, the user equipment 104 may return a result of the binding process to the user 102 after receiving an acknowledgment from the IoT device 106. For example, a prompt that the binding process is completed may be displayed to the user using the smart rice cooker application.

Figure 4:
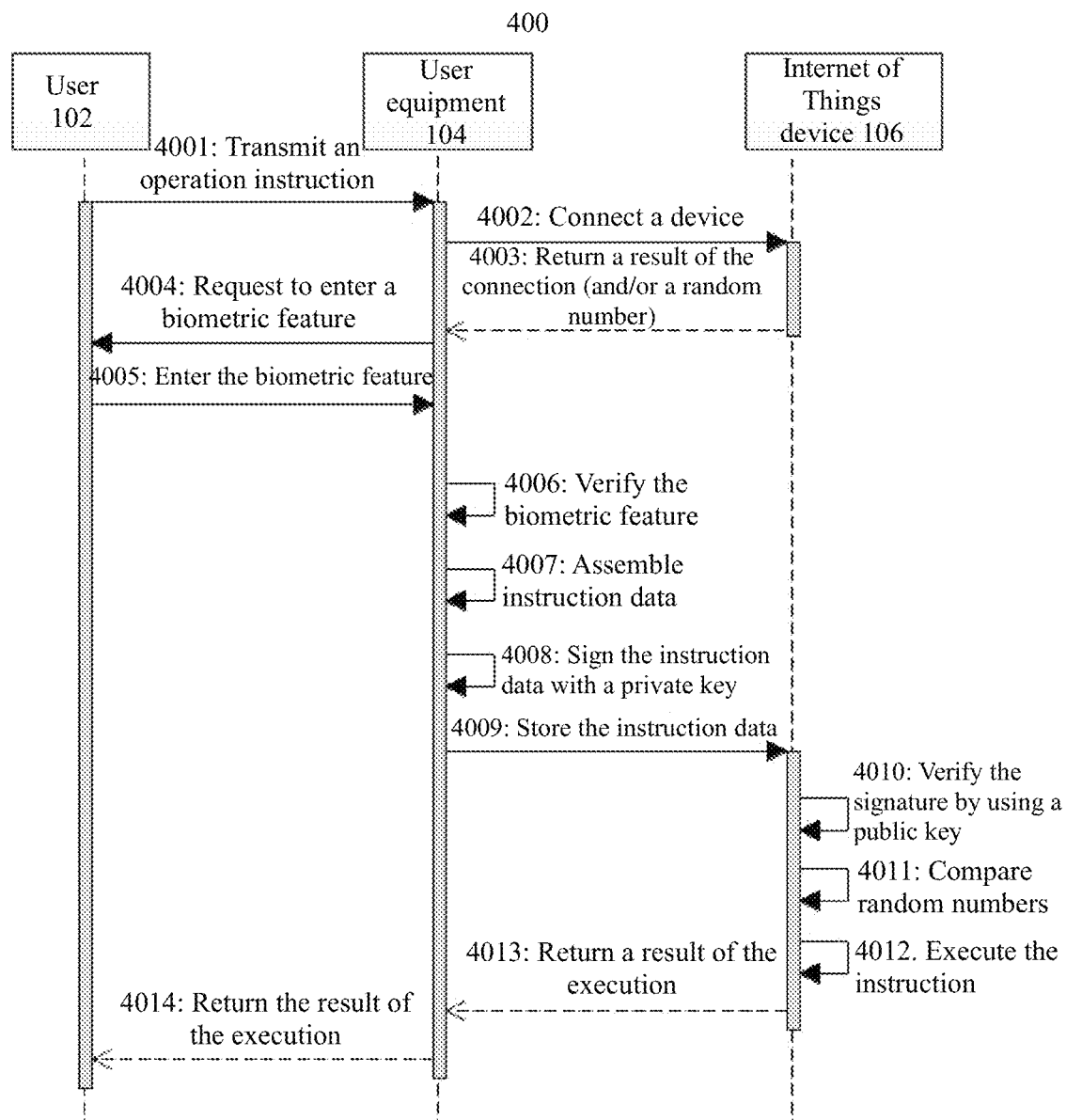
FIG. 4 is a diagram of an example process for operating an IoT device, according to some embodiments of this specification.

FIG. 4 is a diagram of an example process for operating an IoT device. according to some embodiments of this specification. As shown in FIG. 4, a process 400 can involve a user 102, a user equipment 104, and an IoT device 106 (e.g., the user 102, the user equipment 104, and the IoT device 106 shown in FIG. 1).

In some embodiments, in operation 4001 of FIG. 4, when the user 102 wants to operate the IoT device 106, the user 102 may initiate an operation instruction using the user equipment 104. The operation on the IoT device 106 may be, for example, management for the IoT device 106 or other interactions with the IoT device 106.

In some embodiments, the user 102 may tap or click a corresponding control in a smart rice cooker application in the user equipment 104 to operate the IoT device. For example, in the smart rice cooker application, after selecting parameters such as "rice type" and "taste", the user may tap or click a "start" button on the smart rice cooker application, so as to transmit an instruction for starting cooking to a smart rice cooker.

The user equipment 104 may receive the operation instruction from the user 102. In operation 4002 of FIG. 4, the user equipment 104 may attempt to connect to the IoT device 106 based on the operation instruction. In some embodiments, the connection may be implemented using the router 108 shown in FIG. 1 or implemented in another manner In some embodiments, the connection may be an automatic connection after the user opens the smart rice cooker application, and then the user may transmit the operation instruction using the application.

In some embodiments, in operation 4003 of FIG. 4, after the connection is established successfully, the IoT device 106 may return a connection result to the user equipment 104.

In some embodiments, in operation 4003 of FIG. 4, the IoT device 106 may return a random number to the user equipment 104. In some embodiments, if the connection is established automatically, after the smart rice cooker application is opened, the IoT device 106 may return the random number to the user equipment 104 after the user transmits the operation instruction. In some embodiments, the random number is generated and stored by the IoT device 106. The random number may be used for ensuring that the operation instruction is executed only once, so as to enhance the security of the IoT device 106. It is appreciated that the random number may be generated using any random number generation solution.

In some embodiments, the IoT device 106 may not perform the step of generating and storing the random number. As a result, a single operation instruction may be performed for a plurality of times. For example, in operation 4004 of FIG. 4, the user equipment 104 may request the user 102 to enter or provide a biometric feature. For example, it may be displayed in the smart rice cooker application in the user equipment 104 "Please scan a fingerprint."

In operation 4005 of FIG. 4, the user 102 may enter or provide the biometric feature to the user equipment 104 in response to the request. For example, the user 102 may put a finger on a fingerprint scanner of the user equipment 104 to enter the fingerprint feature.

In operation 4006 of FIG. 4, the user equipment 104 may receive and verify the biometric feature entered by the user 102. For example, the user equipment 104 may scan the fingerprint of the user using the fingerprint scanner. In some embodiments the user equipment 104 may extract a fingerprint feature from the scanned fingerprint and compare the extracted fingerprint feature with a stored user fingerprint feature, so as to determine whether the two fingerprint features match and further authenticate the user's identity.

In some embodiments, if the biometric feature (e.g., fingerprint feature) provided by the user matches the stored user fingerprint feature, the identity of the user can be successfully authenticated. In some embodiments, if the biometric feature (e.g., fingerprint feature) provided by the user does not match the stored user fingerprint feature, the user may be prompted that the fingerprints do not match. In some embodiments, the biometric feature may be re-verified or the operation process may end.

In some embodiments, in operation 4007 of FIG. 4, after the user fingerprint is verified successfully, the user equipment 104 may assemble instruction data. For example, based on the instruction (e.g., an instruction of starting cooking)

transmitted by the user 102 using the user equipment 104 and the random number returned by the IoT device 106 in operation 4003, the user equipment 104 may generate instruction data used for the IoT device 106. In some embodiments, the random number is not used (e.g., the IoT device 106 does not return the random number in operation 4003), the user equipment 104 may assemble the instruction data based on the instruction transmitted by the user 102.

In operation 4008 of FIG. 4, the user equipment 104 may sign the instruction data using a stored user private key. In some embodiments, the user equipment 104 may sign the instruction data using a stored user public key or a user private key.

In operation 4009 of FIG. 4, the user equipment 104 may transmit the signed instruction data to the IoT device 106. For example, the user equipment 104 may transmit the signed instruction data to the IoT device 106 using the connection established in operation 4002.

In some embodiments, the IoT device 106 may receive the signed instruction data from the user equipment 104. In operation 4010 of FIG. 4, the IoT device 106 verifies the instruction data that is signed using the user private key. In some embodiments, the IoT device 106 can verify the instructions data using the user public key stored in the IoT device 106.

In some embodiments, if the signed instruction data cannot be verified successfully, it is determined that the instruction data is not signed using a valid user private key. As a result, the IoT device 106 can refuse to execute the user instruction (e.g., a cooking instruction) or return an error report to the user equipment 104. In some embodiments, upon receiving the error report, the user equipment 104 may display information indicating the error (e.g., a signature error) to the user 102.

In some embodiments, if the signed instruction data is verified successfully, it is determined that the instruction data is signed using valid data (e.g., a valid user private key). In some embodiments, When it is determined that the instruction data is signed using valid data, the IoT device 106 can perform operation 4011.

In operation 4011 in FIG. 4, if the IoT device 106 generated a random number previously, the IoT device 106 may compare the random number included in the instruction data with the random number that is previously generated and stored. In operation 4012 in FIG. 4, if a random number included in the instruction data is the same as the stored random number, the IoT device 106 may execute an instruction in the instruction data. For example, the IoT device 106 may extract the instruction in the instruction data and execute the instruction (e.g., a cooking instruction).

In some embodiments, The IoT device 106 may invalidate the random number (e.g., by deleting the random number). If the random number included in the instruction data is different from the stored random number or the instruction data does not include the random number, the IoT device 106 may not execute the instruction in the instruction data. In some embodiments, if the random number included in the instruction data is different from the stored random number or the instruction data does not include the random number, the IoT device 106 may return an error report to the user equipment 104.

In some embodiments, the operations of comparing the random numbers may be performed before the operations of verification using the private key.

In some embodiments, if the IoT device 106 did not generate a random number previously, the foregoing operations of comparing the random numbers may be skipped. As a result, the user equipment 104 may transmit the operation instructions for a plurality of times, and as shown in operation 4012 of FIG. 4, the IoT device 106 may execute these operation instructions for a plurality of times.

In some embodiments, after executing the instructions in the instruction data, in operation 4013 of FIG. 4, the IoT device 106 may return a result of the execution to the user equipment. For example, the IoT device 106 may return, to the user equipment 104, an acknowledgment that the cooking instruction has been executed successfully.

In operation 4014 of FIG. 4, the user equipment 104 may return the result of the execution to the user 102. For example, the user equipment 104 may display information "the cooking has started" to the user 102 in the smart rice cooker application.

As shown in the process of FIG. 4, an identity of a user can be verified using a biometric feature, thereby avoiding risks related to stealing of a user name or a password and further improving the security of a system that involves an IoT device. Further, the key pairs and the generated random numbers can further enhance the security of the system.

It is appreciated that that system shown in FIG. 1 and operations shown in FIG. 2, FIG. 3, and FIG. 4 can have many variations. For example, the public key and the private key pair may not be generated during the entry of the user biometric feature. Instead, the public key and the private key pair can be generated during the binding of the IoT device. For example, operation 2006 in FIG. 2 may be performed after operation 3006 in FIG. 3. In another variation, not all operation instructions need to be verified using a user biometric feature. For example, in some embodiments, after receiving the operation instruction, the user equipment 104 may first determine a secure level of the operation instruction, and require, only when the secure level is relatively high, the user to display a biometric feature for verification.

In addition, although the foregoing descriptions show examples of an asymmetric encryption solution (e.g., the public key and the private key pair), it is appreciated that a symmetric encryption solution may also be adopted, and both the user public key and the user private key may be replaced with the same user key.

Figure 5:
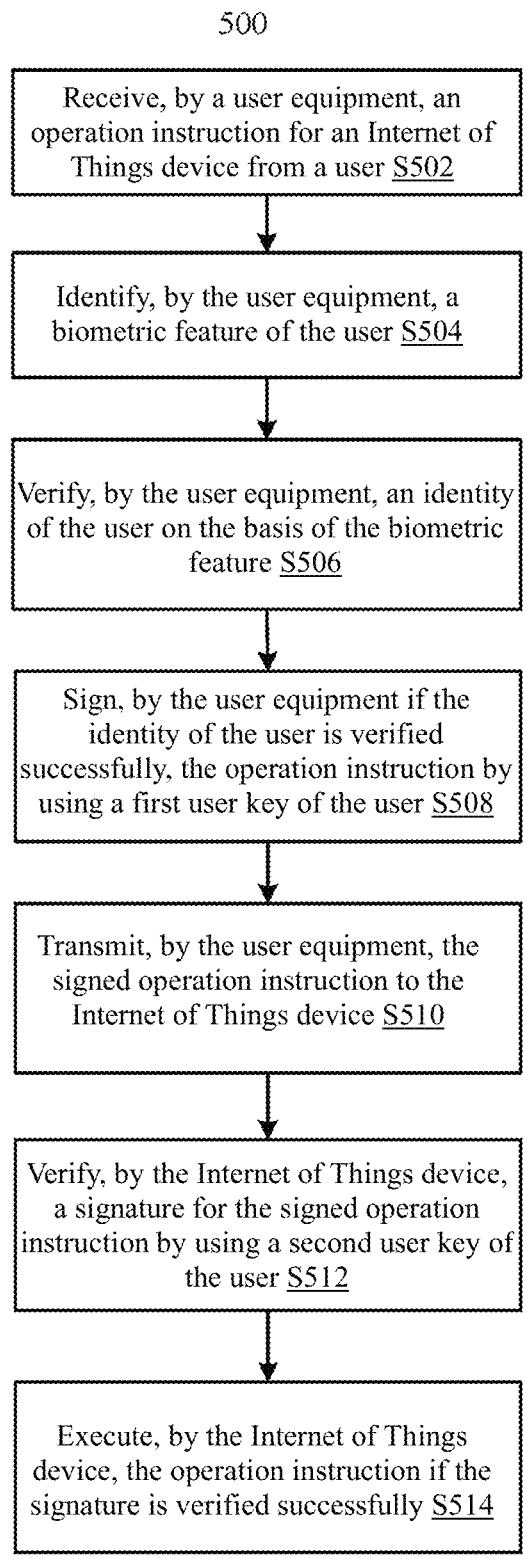
FIG. 5 is a flowchart of an example method for operating an IoT device, according to some embodiments of this specification.

FIG. 5 is a flowchart of a method for operating an IoT device, according to some embodiments of this specification. It is appreciated that the method 500 shown in FIG. 5 can be performed by the system 100 shown in FIG. 1. In some embodiments, the method 500 is performed by a user equipment (e.g., user equipment 104 shown in FIG. 1, FIG. 2, FIG. 3, or FIG. 4).

In step S502, an operation instruction for an IoT device is received from a user (e.g., the user 102 of FIG. 1, FIG. 2, FIG. 3, or FIG. 4). For example, the user may tap or click a control on an application interface of the IoT device on the user equipment to transmit the operation instruction (e.g., an instruction of starting cooking for a rice cooker).

In step S504, a biometric feature of the user is identified. In some embodiments, the user equipment may request the user to enter the biometric feature and then receive the biometric feature entered by the user.

In step S506, an identity of the user is verified based on the biometric feature. For example, the user equipment may compare the biometric feature entered by the user with a biometric feature of a user previously stored, to verify whether the user is a user associated with the IoT device.

In step S508, if the identity of the user is verified successfully, the operation instruction is signed using a first user key of the user. For example, the first user key and the second user key may be generated previously by the user equipment for a user whose biometric feature has been entered. In some embodiments, the first user key is a user private key for the user, and the second user key is a user public key for the user. In some embodiments, the first user key and the second user key are the same user key of the user.

In some embodiments, the first user key and the second user key may be generated by the user equipment during the entry of the biometric feature or during the binding of the IoT device. In some embodiments, the generating, by the user equipment, the first user key and the second user key can further include: entering, by the user equipment, the biometric feature of the user, and generating, by the user equipment, the first user key and the second user key for the user after the biometric feature is entered.

In some embodiments, the first user key and the second user key can be stored in a secure environment of the user equipment. In some embodiments, the secure environment can be a TEE or an SE (e.g., a hardware SE).

In some embodiments, the method 500 may further include step S510. In step S510, the signed operation instruction is transmitted to the IoT device. In some embodiments, both a random number and the signed operation instruction received from the IoT device are transmitted to the IoT device by the user equipment.

In some embodiments, the method 500 may further include step S512. In step S512, a signature (e.g., the first user key) for the signed operation instruction is verified using the second user key of the user. In some embodiments, the second user key and the first user key constitute a key pair.

In some embodiments, the method 500 may further include step S514. In step S514, the operation instruction is executed if the signature is verified successfully. In some embodiments, the IoT device compares a random number received from the user equipment with a random number generated by the IoT device, and executes the operation instruction when the random number received by the IoT device from the user equipment and the random number generated by the IoT device are consistent. In some embodiments, after executing the operation instruction, the IoT device may invalidate the random number.

In some embodiments, before the IoT device is operated, the IoT device may be bound by the user equipment through the following operations: identifying, by the user equipment, the biometric feature of the user; verifying, by the user equipment, the identity of the user based on the biometric feature; and transmitting, by the user equipment, the second user key to the IoT device if the identity of the user is verified successfully.

Figure 6:
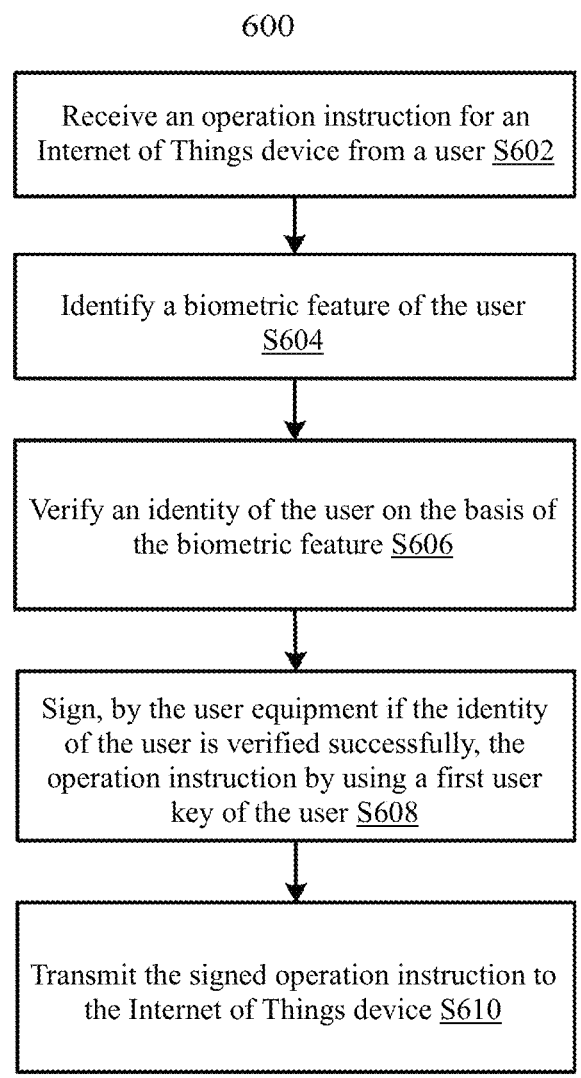
FIG. 6 is a flowchart of an example method for operating an IoT device, according to some embodiments of this specification.

FIG. 6 is a flowchart of an example method for operating an IoT device, according to some embodiments of this specification. In some embodiments, the method 600 shown in FIG. 6 can be performed by the system 100 shown in FIG. 1. In some embodiments, method 600 can be performed by a user equipment (e.g., user equipment 104 shown in FIG. 1, FIG. 2, FIG. 3, or FIG. 4).

In step S602, an operation instruction for an IoT device (the IoT device 106 shown in FIG. 1, FIG. 2, FIG. 3, or FIG. 4) is received from a user (e.g., the user 102 shown in FIG. 1, FIG. 2, FIG. 3, or FIG. 4).

In step S604, a biometric feature of the user is identified.

In step S606, an identity of the user is verified based on the biometric feature.

In step S608, if the identity of the user is verified successfully, the operation instruction is signed using a first user key of the user.

In step S610, the signed operation instruction is transmitted to the IoT device. The signature (e.g., the first user key) can be used by the IoT device to authenticate the identity of the user using a second user key. In some embodiments, the second user key and the first user key constitute a key pair.

Figure 7:
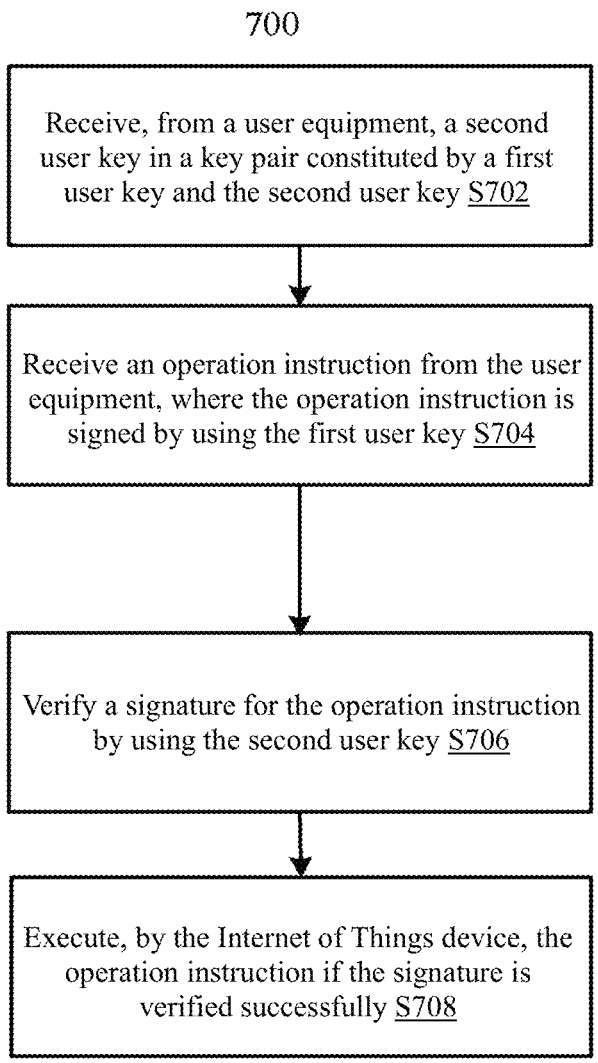
FIG. 7 is a flowchart of an example method for operating an IoT device, according to some embodiments of this specification.

FIG. 7 is a flowchart of an example method for operating an IoT device, according to some embodiments of this specification. In some embodiments, the method 700 shown in FIG. 7 can be performed by the system 100 of FIG. 1. In some embodiments, the method 700 can be performed by an IoT device (e.g., IoT device 106 of FIG. 1, FIG. 2, FIG. 3, or FIG. 4).

In step S702, a second user key in a key pair is received from a user equipment (e.g., The user equipment 104 shown in FIG. 1, FIG. 2, FIG. 3, or FIG. 4). In some embodiments, the key pair includes a first user key and the second user key.

In step S704, an operation instruction is received from the user equipment. In some embodiments, the operation instruction is signed using the first user key.

In step S706, a signature (e.g., the first user key) for the operation instruction is verified using the second user key.

In step S708, the operation instruction is executed if the signature can be verified successfully.

In some embodiments, the method 700 may further include generating a first random number and transmitting the first random number to the user equipment. Subsequently, a second random number is further received from the user equipment when the operation instruction from the user equipment is received. The second random number may be compared with the first random number, and the operation instruction is executed only when the second random number and the first random number are consistent. In some embodiments, the first random number can be invalidated after the operation instruction is executed. For example, the first random number may be deleted.

Embodiments of this specification further provide a computer-readable storage medium storing computer executable instructions. The computer executable instructions, when executed by a processor, can cause the processor to perform the methods and the operations of the embodiments described herein.

The computer-readable medium includes a volatile medium and a non-volatile medium, a removable medium and a non-removable medium, which may implement storage of information by using any method or technology. The information may be a computer-readable instruction, a data structure, a module of a program, or other data. Examples of computer storage media include, but are not limited to, a phase change memory (PRAM), a static random access memory (SRAM), a dynamic random access memory (DRAM), other type of random access memory (RAM), a read-only memory (ROM), an electrically erasable programmable read-only memory (EEPROM), a flash memory or other memory technology, a compact disc read-only memory (CD-ROM), a digital versatile disc (DVD) or other optical storage, a cassette magnetic tape, tape and disk storage or other magnetic storage device or any other non-transmission media that may be configured to store information that a computing device can access. Based on the definition in the present disclosure, the computer readable medium does not include transitory computer readable media (transitory media), such as a modulated data signal and a carrier.

Embodiments of this specification further provide a computer device for operating an IoT device. The device includes at least a memory, a processor, and a computer program stored on the memory and executable on the processor. When executing the program, the processor implements functions of the methods and operations described herein.

It may be learned from description of the foregoing implementations that, a person skilled in the art may clearly understand that the embodiments of this specification may be implemented by using software in addition to a necessary universal hardware platform. Based on such an understanding, the technical solutions of the embodiments of this specification essentially or the part contributing to the existing technologies may be implemented in a form of a software product. The computer software product may be stored in a storage medium, such as a ROM/RAM, a hard disk, or an optical disc, and includes a plurality of instructions for instructing a computer device (which may be a personal computer, a server, or a network device) to perform the methods described in the embodiments or some parts of the embodiments of this specification.

In this specification, the embodiments are described in a progressive manner Reference may be made to each other for the same or a similar part of the embodiments. Each embodiment focuses on a difference from other embodiments. Especially, apparatus and device embodiments are basically similar to a method embodiment, and therefore are described briefly; for related parts, refer to partial descriptions in the method embodiment. The method embodiment described above is merely an example. The modules described as separate parts may or may not be physically separate. During implementation of the solutions of the embodiments of this specification, the function of the modules may be implemented in the same piece of or a plurality of pieces of software and/or hardware. A part or all of the modules may be selected according to actual needs to achieve the objectives of the solutions of the embodiments. A person of ordinary skill in the art may understand and implement this specification without creative efforts.

It is appreciated that specific embodiments of this specification are described above. Other embodiments fall within the scope of the appended claims. In some cases, the actions or steps recorded in the claims may be performed in sequences different from those in the embodiments and an expected result may still be achieved. In addition, the processes depicted in the accompanying drawings is not necessarily performed in the specific order or successively to achieve an expected result. In some implementations, multitasking and parallel processing may be feasible or beneficial.

It is appreciated that an element described in a singular form herein or displayed only one in the accompanying drawings does not represent that the element is limited to one. In addition, modules or elements described or shown as separate herein may be combined into a single module or element, and a module or an element described or shown herein as a single module or element may be split into a plurality of modules or elements.

It is appreciated that the terms and expression manners used herein are merely for description, and one or more embodiments of this specification should not be limited to these terms and expressions. The use of these terms and expressions does not mean to exclude any equivalent features of the illustration and description (or part of them), and it should be understood that various modifications that may exist should also be included in the scope of claims. Other modifications, changes, and replacements may also exist. Accordingly, the claims should be considered as covering all these equivalents.

It is appreciated that although the descriptions are made with reference to current specific embodiments, a person of ordinary skill in the art should understand that the foregoing embodiments are only used for illustrating one or more embodiments of this specification. Various equivalent changes or substitutions may be made without departing from the spirit of this application. Therefore, changes and modifications to the foregoing embodiments within the essential spirit of this application shall fall into the scope of the claims of this application.

What is claimed is:

1. A method, comprising:
   generating, by an Internet of Things (IoT) device, a first random number;
   receiving, by user equipment, the first random number from the IoT device;
   receiving, by the user equipment, an operation instruction for operating the IoT device from a user, wherein the user equipment is communicatively coupled with the IoT device;
   identifying, by the user equipment, a biometric feature of the user;
   verifying, by the user equipment, an identity of the user based on the biometric feature;
   signing, by the user equipment, the operation instruction for operating the IoT device using a first user key of the user in response to the identity of the user being verified;
   transmitting, by the user equipment, a second random number and the signed operation instruction to the IoT device;
   verifying, by the IoT device, the signed operation instruction using a second user key of the user;
   comparing, by the IoT device, the second random number transmitted from the user equipment with the first random number generated by the IoT device;
   executing, by the IoT device, the operation instruction to operate the IoT device in response to that the second random number transmitted from the user equipment is consistent with the first random number generated by the IoT device, and that the signed operation instruction is verified; and
   invalidating, by the IoT device, the first random number generated by the IoT device in response to the operation instruction being executed.

2. The method according to claim 1, wherein the second random number transmitted by the user equipment is the first random number received by the user equipment from the IoT device.

3. The method according to claim 1, wherein the first user key is a user private key of the user, and the second user key is a user public key of the user.

4. The method according to claim 1, wherein the first user key and the second user key are the same user key of the user.

5. The method according to claim 1, further comprising:
   binding, by the user equipment and prior to receiving the operation instruction for the IoT device from the user, the IoT device to the user equipment.

6. The method according to claim 5, wherein the binding, by the user equipment, the IoT device to the user equipment comprises:
   identifying, by the user equipment, the biometric feature of the user;
   verifying, by the user equipment, the identity of the user based on the biometric feature; and transmitting, by the user equipment, the second user key to the IoT device in response to the identity of the user being verified.

7. The method according to claim 1, further comprising: generating, by the user equipment, the first user key and the second user key.

8. The method according to claim 7, wherein the generating, by the user equipment, the first user key and the second user key comprises:
receiving, by the user equipment, the biometric feature of the user entered by the user, and
generating, by the user equipment, the first user key and the second user key for the user.

9. The method according to claim 1, wherein the first user key and the second user key are stored in a secure environment of the user equipment, and the secure environment is a trusted execution environment or a hardware secure element.

10. A system, comprising:
user equipment configured to:
receive a first random number from an Internet of Things (IoT) device;
receive an operation instruction for the IoT device from a user,
identify a biometric feature of the user,
verify an identity of the user based on the biometric feature,
sign the operation instruction using a first user key of the user if the identity of the user is verified, and
transmit a second random number and the signed operation instruction to the IoT device; and
the IoT device, configured to:
generate the first random number;
receive the second random number and the signed operation instruction transmitted from the user equipment,
verify the signed operation instruction using a second user key of the user,
compare the second random number transmitted from the user equipment with the first random number generated by the IoT device,
execute the operation instruction if the second random number transmitted from the user equipment is consistent with the first random number generated by the IoT device and the signed operation instruction is verified, and
invalidate the first random number generated by the IoT device after the operation instruction is executed.

11. The system according to claim 10, wherein:
the user equipment is further configured to:
transmit second random number received from the IoT device and the signed operation instruction to the IoT device, wherein the second random number is the first random number received by the user equipment from the IoT device; and
the IoT device is further configured to:
store the random number generated by the IoT device.

12. The system according to claim 11, wherein the user equipment is further configured to:
bind the user equipment to the IoT device before the user equipment receives the operation instruction for the IoT device from the user.

13. The system according to claim 12, wherein to bind the user equipment to the IoT device, the user equipment is further configured to:
identify the biometric feature of the user;
verify the identity of the user based on the biometric feature; and
transmit the second user key to the IoT device if the identity of the user is verified.

14. The system according to claim 10, wherein the user equipment is further configured to:
generate the first user key and the second user key.

15. The system according to claim 14, wherein the user equipment is further configured to:
receive the biometric feature of the user entered by the user, and
generate the first user key and the second user key for the user.

16. The system according to claim 10, wherein:
the user equipment comprises a secure environment,
the user equipment is further configured to store the first user key and the second user key in the secure environment, and
the secure environment is a trusted execution environment or a hardware secure element.

17. The system according to claim 10, wherein:
the system further comprises a router, and
the user equipment is configured to communicate with the IoT device using the router.

18. A system, comprising:
user equipment, comprising: (i) one or more user equipment processors and (ii) one or more user equipment memories storing first computer-readable instructions that, when executed by the one or more user equipment processors, cause the one or more user equipment processors to perform operations comprising:
receiving a first random number from an Internet of Things (IoT) device;
receiving an operation instruction for the IoT device from a user, wherein the user equipment is communicatively coupled with the IoT device;
identifying a biometric feature of the user;
verifying an identity of the user based on the biometric feature;
signing the operation instruction using a first user key of the user in response to the identity of the user being verified; and
transmitting a second random number and the signed operation instruction to the IoT device; and
the IoT device, comprising: (i) one or more IoT device processors and (ii) one or more IoT device memories storing second computer-readable instructions that, when executed by the one or more IoT device processors, cause the one or more IoT device processors to perform operations comprising:
generating the first random number;
receiving the second random number and the signed operation instruction transmitted from the user equipment;
verifying the signed operation instruction using a second user key of the user;
comparing the second random number transmitted form the user equipment with the first random number generated by the IoT device;
executing the operation instruction in response to that the second random number transmitted from the user equipment is consistent with the first random number generated by the IoT device, and that the signed operation instruction is verified; and invalidating the first random number generated by the IoT device after the operation instruction is executed.

* * * * *